United States Patent [19]

Matsuoka et al.

[11] 4,267,494
[45] May 12, 1981

[54] APPARATUS FOR ADJUSTING THE POSITION AND/OR ANGLE OF EACH MOVABLE EQUIPMENT OF A MOTOR VEHICLE

[75] Inventors: Hideoki Matsuoka, Yokohama; Takashi Oka, Tokyo; Masanori Mizote, Yokosuka; Kiyoshi Yamaki, Yokohama; Hiroyuki Nomura, Yokohama; Takaaki Mogi, Yokohama; Akitoshi Mimura, Tokorozawa, all of Japan

[73] Assignee: Nissan Motor Company, Limited, Yokohama, Japan

[21] Appl. No.: 4,205

[22] Filed: Jan. 17, 1979

[30] Foreign Application Priority Data

Jan. 30, 1978 [JP] Japan .................................. 53/9523

[51] Int. Cl.³ .............................................. G05B 19/42
[52] U.S. Cl. ..................................... 318/568; 180/326; 307/10 R
[58] Field of Search ............... 318/600, 601, 603, 568; 296/63, 65 R; 180/77 N; 307/10 R, 10 SB; 280/226 R, 226 A

[56] References Cited

U.S. PATENT DOCUMENTS

| | | | |
|---|---|---|---|
| 3,752,969 | 8/1973 | Kiffmeyer | 318/601 |
| 4,081,732 | 3/1978 | Aoyama | 318/601 X |
| 4,128,797 | 12/1978 | Murata | 318/658 X |
| 4,131,835 | 12/1978 | Lange | 318/600 X |

Primary Examiner—B. Dobeck

[57] ABSTRACT

An apparatus for adjusting the position and/or angle of each movable equipment of a motor vehicle comprises sensors to produce electrical signals indicative of the position and/or angle of each movable equipment, memory circuit including a plurality of memory units for respectively storing sensed information indicative of the optimal positions and/or angles of the equipment for each driver, comparators responsive to the sensed information and the stored information, and driving circuitry responsive to output signals of the comparators to adjust the positions and/or angles of the equipment. When the drivers are changed, the sensed information is compared with the stored information and then the position and/or angle of each equipment is adjusted until the sensed information equals the stored information to provide the driver with the optimal position and/or angle.

12 Claims, 4 Drawing Figures

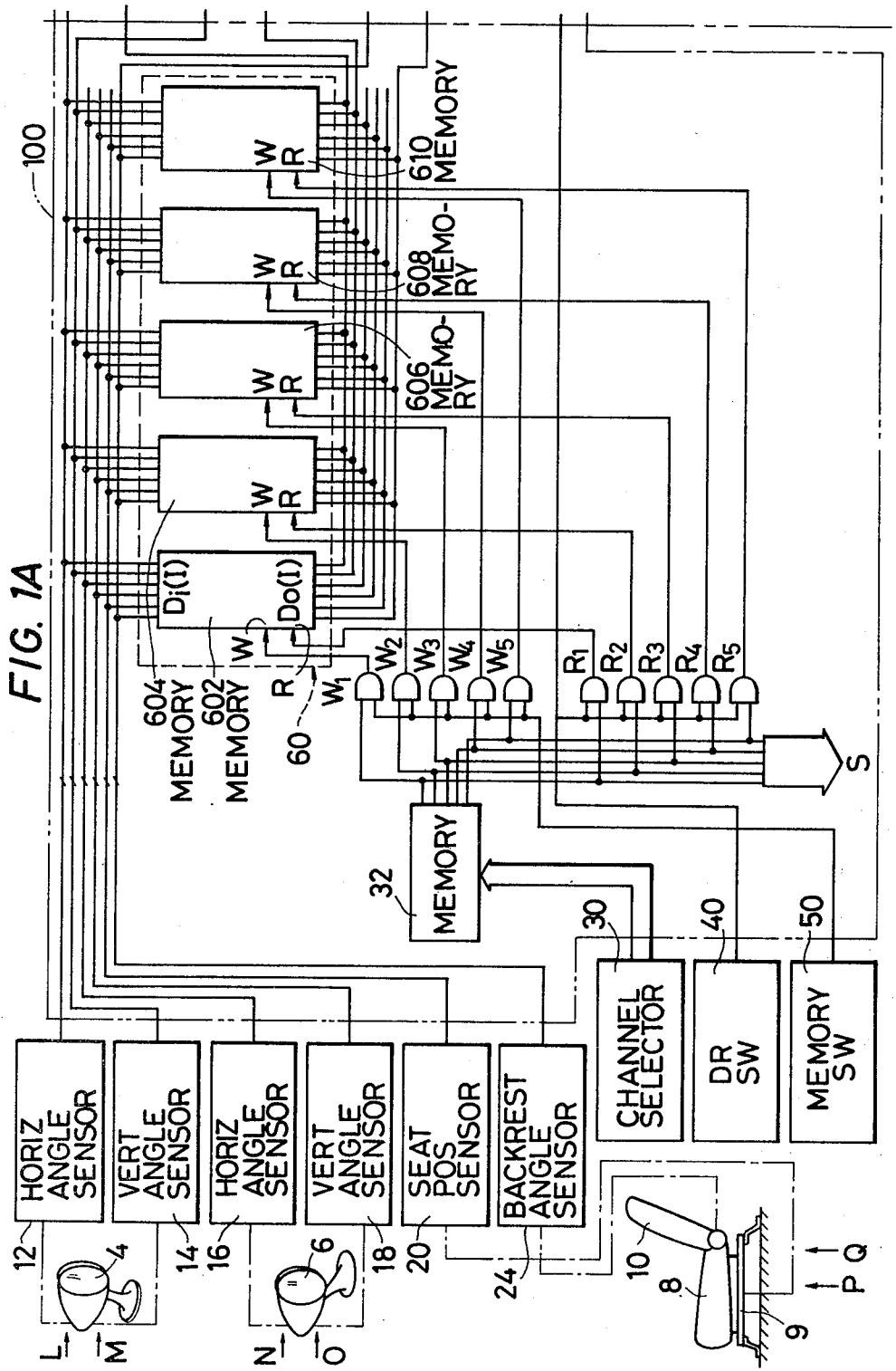

APPARATUS FOR ADJUSTING THE POSITION AND/OR ANGLE OF EACH MOVABLE EQUIPMENT OF A MOTOR VEHICLE

FIELD OF THE INVENTION

The present invention generally relates to an apparatus for adjusting the position and/or angles of each movable equipment, such as a driver's seat and rear-view mirrors, of a motor vehicle.

BACKGROUND OF THE INVENTION

The longitudinal position of the driver's seat is usually adjusted by the driver manually. Not only the position of the driver's seat also the reclining angle of the backrest and angles of the rear-view mirrors are usually adjusted so as to provide the best position of the driver and the rear-view for the safe and comfortable drive of the motor vehicle. In some motor vehicles, the angles of the rear-view mirrors are adjusted by means of electrical motors which are manually operated by a suitable switch disposed in the compartment of the motor vehicle, such as on the instrument panel, so that the angles of the rear-view mirror are set easily by watching the rear views in the mirrors, while the driver sits on the driver's seat. However, when the longitudinal position of the driver's seat is changed and/or the angle of the reclining backrest of the seat is changed to an extent, the angles of the rear-view mirrors have to be readjusted since the positions of the eyes of the driver are changed. These adjustments of vehicle equipment are usually troublesome and time consuming.

When a vehicle is always used (driven) by the same driver, the driver does not have to adjust various movable equipment each time he rides on the vehicle if everything is well adjusted once. On the other hand, when a single vehicle is commonly used by a plurality of drivers, each driver has to make adjustments of the movable equipment each time the drivers are changed.

SUMMARY OF THE INVENTION

This invention has been achieved in order to remove the above mentioned disadvantages inherent to the conventional adjusting system for various movable equipment of a motor vehicle.

The position of the driver's seat and the angles of the backrest and the rear-view mirrors are manually adjusted once so as to provide optimal position of the driver and the rear-views for each driver by operating keys or switches. The optimal position and angles are sensed by sensors to produce electrical signals indicative thereof. These signals are stored in a memory circuit having a plurality of channels provided to correspond to respective drivers. When drivers are changed, the signals stored in the memory circuit are read out so that specific information inherent to a specific driver is compared with sensed information to see if there is difference therebetween. The difference between two pieces of information is used to energize electric motors to adjust the positions and/or the angles of various equipment, thereby reestablishing the optimal position and angles of equipment for the specific driver.

It is therefore, an object of the present invention to provide an apparatus for automatically adjusting the position and/or angle of each movable equipment of a motor vehicle.

Another object of the present invention is to provide such an apparatus in which the position and/or angle of each movable equipment is adjusted for each driver when the drivers are changed.

BRIEF DESCRIPTION OF THE DRAWINGS

These and other objects and features and advantages of the present invention will become more readily apparent from the following detailed description of the preferred embodiment taken in conjunction with accompanying drawings in which:

FIGS. 1A and 1B show in schematic block diagram a preferred embodiment of the apparatus according to the present invention;

DETAILED DESCRIPTION OF THE PREFERRED EMBODIMENT

Figure 1B:
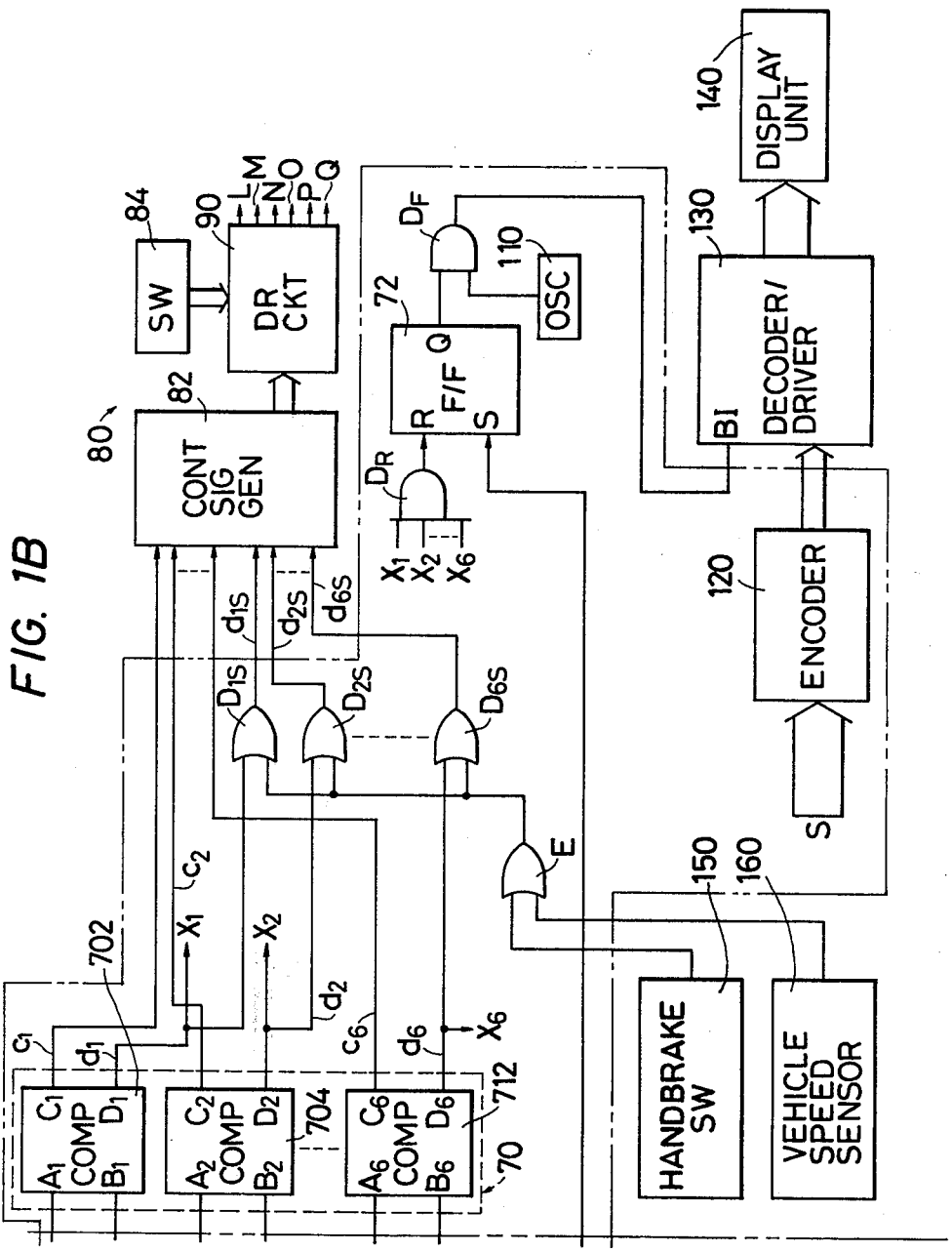

Referring to FIG. 1, a block diagram of a preferred embodiment of the apparatus for automatically adjusting the position and/or angle of each movable equipment of a motor vehicle is shown. The apparatus shown, is designed to be used for the adjustments of the angles of rear-view mirrors 4 and 6, the reclining angle of the backrest 10 of the driver's seat 8 and the longitudinal position of the driver's seat 8 of a motor vehicle.

Each of the mirrors 4 and 6 of right and left sides, is arranged to rotate in first and second directions, i.e. left-right direction and up-down direction when seen from the driver's seat 8. The rotational angles of each of the rear-view mirrors 4 and 6 in the first and second directions will be referred to as a horizontal angle and a vertical angle respectively hereinbelow throughout the specification.

The backrest 10 of the driver's seat 8 is arranged to assume various angles by rotating with respect to a pivot (no numeral) operatively connected to the driver's seat 8. The driver's seat 8 is arranged to slide on a stationary rail 9 back and forth so as to change the longitudinal position thereof.

For sensing the position and angles of the driver's seat 8, backrest 10 and the rear-view mirrors 4 and 6, there are provided six sensors 12 to 24. The first and second sensors 12 and 14 are operatively disposed in the casing (no numeral) of the rear-view mirror 4 of the right side to respectively produce signals indicative of the horizontal and vertical angles of the mirror 4. The third and fourth sensors 16 and 18 are also like sensors for producing signals indicative of the horizontal and vertical angles of the left side mirror 6. The fifth sensor 20 is employed for producing a signal indicative of the longitudinal position of the driver's seat 8, while the sixth sensor 24 is provided for producing a signal indicative of the rotational angle of the backrest 10. Signals originally produced in respective sensors 12 to 24 are analogue signals and these analogue signals are converted into digital signals via suitable analogue to digital converters which are assumed to be included in the respective sensors 12 to 24. In other words, each of the sensors 12 to 24 produces an output signal in the form of a digital (binary-coded) signal.

Each of the rear-view mirrors 4 and 6, driver's seat 8 and the backrest 10 is equipped with a suitable driving mechanism (not shown) to change the angles and/or position thereof.

A reference numeral 30 indicates a channel selector which is used to select a specific channel from a plurality of channels provided to correspond to respective drivers. In this embodiment, five channels are provided so that the apparatus is used for making adjustments of vehicle equipment with respect to as many as five drivers.

A memory circuit generally denoted by a reference numeral 60 consists of five memory units 602, 604, 606, 608 and 610 which are arranged to be enabled in accordance with a channel selected by the channel selector 30. Each of the memory units 602 to 610 has six inputs, six outputs, a WRITE-IN control terminal W and a READ-OUT control terminal R. The first to sixth inputs of each memory unit 602 and 610 are respectively connected to the outputs of the first to sixth sensors 12 to 24. The number of the memory units included in the memory circuit 60 may be increased, if desired, so that the apparatus will be capable of more drivers.

Another memory 32 which is independent from the memory circuit 60 is provided for producing various codes in response to a signal applied from the channel selector 30. The output signals of the memory 32 will be used to control the WRITE-IN and READ-OUT functions of each memory unit 602 to 612. A drive switch 40 is provided for producing a drive-command signal, in the form of a pulse signal, with which the driving mechanism of each equipment is energized to make adjustments.

A comparator circuit which is generally denoted by a reference numeral 70 consists of six digital comparators 702, 704, 706, 708, 710 and 712. For simplicity only three comparators 702, 704 and 712 are shown in the drawing, while the other three are omitted. Each of the comparators 702 and 712 has first and second inputs and first and second outputs, respectively denoted by references $A_1, A_2 \ldots A_6$; $B_1, B_2 \ldots B_6$; $C_1, C_2 \ldots C_6$; and $D_1, D_2 \ldots D_6$. The first input $A_1$ of the first comparator 702 is connected to the output of the first sensor 12, while the first input $A_2$ of the second comparator 704 is connected to the output of the second sensor 14. In the same manner each of the first inputs of the remaining comparators 706 to 712 is connected to each output of the third to sixth sensors 16 to 24. The second input $B_1$ of the first comparator 702 is connected to the first output of all five memory units 602 to 610, while the second input $B_2$ of the second comparator 704 is connected to the second outputs of all five memory units 602 to 610. In the same manner, the second inputs $B_3$ to $B_6$ of the remaining comparators 706 to 712 are respectively connected to the third to sixth outputs of all of the memory units 602 to 610.

From the above described connections, it will be understood that the first comparator 702 is responsive to the output signal of the first sensor 12 (horizontal angle sensor for the right side mirror 4) and an output signal of one selected memory unit 602 to 610. Assuming that the first memory unit 602 is enabled to read-out stored information, the first comparator 702 is in receipt of the actual horizontal angle indicated by the output signal of the first sensor 12 and the other information indicated by one of the output signals of the first memory unit 602, wherein the other information is an indication of a preset horizontal angle of the right side rearview mirror 4.

Namely, two horizontal angles respectively indicated by two input signals of the comparator 702 are compared with each other to see if there is any difference therebetween. The first comparator 702, therefore, produces output signals $C_1$ and $d_1$ at the first and second outputs $C_1$ and $D_1$ in accordance with the result of the comparison. Assuming that the actual horizontal angle of the right side mirror 4 is greater than a preset value (angle) indicated by the output signal of the first memory unit 602, the first digital comparator 702 produces two output signals $c_1$ and $d_1$ respectively having high and low, i.e. logic "1" and "0", levels. The high and low levels of the output signals of the comparators 702 to 712 will be expressed in terms of equations, such as $(c_1,d_1)=(1, 0)$. Suppose the excess of the actual horizontal angle of the right side mirror 4 over the preset angle means that the right side mirror 4 is facing righter than a predetermined direction. Upon presence of the output signals $c_1$ and $d_1$ the levels of which are expressed by $(c_1,d_1)=(1, 0)$, the following stage such as the driving mechanism of the right side mirror 4 is energized to rotate the mirror 4 leftword.

On the other hand, if the actual horizontal angle of the right side mirror is less than the predetermined angle, the first comparator 702 produces output signals $c_1$ and $D_1$ which are expressed in terms of $(c_1,d_1)=(0, 0)$, and therefore, the mirror 4 is rotated rightward so as to set the mirror at the correct angle. When the two angles indicated by the two input signals of the first comparator 702 equal each other, i.e. there is no difference in horizontal angle, the first comparator 702 produces output signals $c_1$ and $d_1$ expressed in terms of $(c_1,d_1)=(0, 1)$ or $(1, 1)$. In this case, the driving mechanism for the adjustment of the horizontal angle of the right side mirror 4 is deenergized to maintain the horizontal angle thereof as is.

In the same manner the second to sixth digital comparators 704 to 712 produce output signals $c_2$ to $c_6$ and $d_2$ to $d_6$ by comparing the actual values sensed by the second to sixth sensors 14 to 24 with preset values stored in one of the memory units 602 to 610. Consequently, each driving mechanism of each equipment is energized to make an adjustment in accordance with the output signals of the comparators 702 to 712.

First to fifth AND gates W1 to W5 are provided for controlling the WRITE-IN function of the memory units 602 to 610 in response to the output signals of the memory 32 and the output signal of the memory control switch 50. The memory 32 has five outputs respectively connected to first inputs of respective AND gates W1 to W5, while the output of the memory control switch 50 is connected to the second inputs of all AND gates W1 to W5. With this arrangement, one of the AND gates W1 to W5 is enabled to produce a high level output signal in accordance with the selected channel. The outputs of the AND gates W1 to W5 are respectively connected to WRITE-IN control terminals W of memory units 602 to 610 so that one of the memory units 602 to 610 is enabled to write-in information applied to the six input terminals from first to sensors 12 to 24 in accordance with a specific channel selected by the channel selector 30, when the memory control switch 50 is operated.

In addition to the above described five AND gates W1 to W5, a series of five AND gates R1 to R5 is provided for controlling the READ-OUT function of the memory units 602 to 610 in response to the output signals of the memory 32 and the output signal of the drive switch 40. The five outputs of the memory 32 are respectively connected to first inputs of the AND gates R1 to R5, while the output of the drive switch 40 is connected to second inputs of all AND gates R1 to R5. The outputs of the AND gates R1 to R5 are respectively connected to the READ-OUT control terminals R of the memory units 602 to 610. Therefore, when the drive switch 40 is operated, one of the memory units 602 to 610, which corresponds to the selected channel, is enabled to read out information stored therein.

It will be understood that one of the memory units 602 to 610 is selected in accordance with the selected channel, and the WRITE-IN and READ-OUT functions of the selected memory unit are respectively controlled by the memory control switch 50 and the drive switch 40.

A handbrake switch 150 is provided for producing a high level output signal when the handbrake of the motor vehicle is unactuated. In other words, the output signal of the handbrake switch 150 assumes a low level when the handbrake is actuated. A vehicle speed sensor 160 is provided for producing a high level output signal only when the vehicle speed is over zero. The outputs of the handbrake switch 150 and the vehicle speed sensor 160 are respectively connected first and second inputs of an OR gate E. These output signals of the handbrake switch 150 and the vehicle speed sensor 160 are used in the following stage to disable the driving mechanism of each equipment when the vehicle is moving or when the handbrake of the motor vehicle is unactuated. It will be discussed hereinlater how the output signal of the OR gate E is used in the apparatus to disable the driving mechanism.

An AND gate $D_R$ is provided to be responsive to the second output signals $d_1$ to $d_6$ of the first to sixth comparators 702 to 712. The second outputs $D_1$ to $D_6$ are respectively connected to six inputs of the AND gate $D_R$, the direct connections therebetween are not shown for simplicity but the connections are indicated by references $X_1$ to $X_6$. The output of the AND gate $D_R$ is connected to a reset terminal R of a flip-flop 72, which has a set terminal S connected to the output of the drive switch 40. As mentioned hereinbefore, the second output signals $d_1$ to $d_6$ of the comparators 702 to 712 respectively assume high level (logic "1") when the sensed position and angles of the equipment equal the preset values stored in each memory unit 602 to 610. In receipt of logic "1" signals at all inputs, the AND gate $D_R$ produces a high level (logic "1") signal to feed the same to the reset terminal R of the flip-flop 72. The output of the flip-flop 72 is connected to an input of an AND gate $D_F$ which has another input connected to an output of an oscillator 110. The oscillator 110 produces an oscillation signal the frequency of which is predetermined, such as at one Hz. The output of the AND gate $D_F$ is connected to an input of a decoder/driver 130, the function of which will be described hereinlater.

Each of the six OR gates $D_{1s}$ to $D_{6s}$ has two inputs, one of which is connected to the above mentioned second output $D_1$ to $D_6$ of the each digital comparator 702 to 712 and the other input is connected to the output of the OR gate E which is responsive to the output signal of the handbrake switch 150 and the output signal of the vehicle speed sensor 160. The outputs of the six OR gates $D_{1s}$ to $D_{6s}$ are respectively connected to inputs of the control signal generator 82.

An encoder 120 is provided for encoding the output signals of the memory 32, the connection between thereof is shown by wide directed lines denoted by S. The output of the encoder 120 is connected to an input of the decoder/driver 130, the output of which is connected to an input of a display unit 140 such as a seven-segment display device. The display unit 140 visually displays a numeral indicative of the selected channel. If desired, however, the seven-segment display device may be substituted by a series of light emitting diodes (LED).

A driving unit 80 includes the above mentioned control signal generator 82, a manual switch 84, and driving circuitry 90. In accordance with the preferred embodiment shown in FIG. 1, the horizontal and vertical angles of rear-view mirrors 4 and 6 of the right and left sides, the longitudinal position of the driver's seat 8, and the angle of the backrest 10 are to be adjusted, so that six driving circuits and six switches are actually provided. In other words, the driving circuitry 90 shown in FIG. 1 includes six independent driving circuits which respectively causes each driving mechanism to operate, while the switch 84 includes six manual switches which are used to manually control each driving mechanism. The outputs of the six driving circuits included in the driving circuitry 90 are respectively connected to each driving mechanism which includes at least one electric motor, where the direct connections between respective driving circuits and respective driving mechanisms are not shown but indicated by references L, M, N, O, P and Q.

Figure 2:
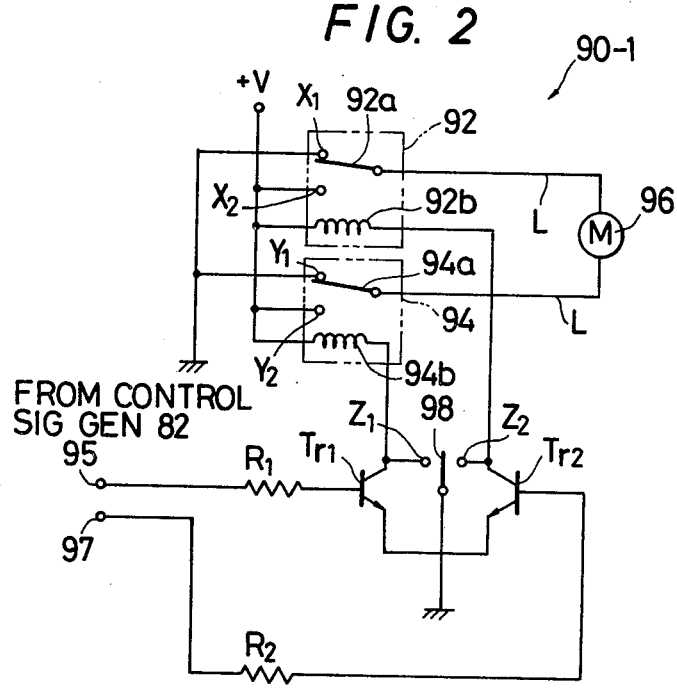
FIG. 2 shows a detailed circuit diagram of a driving circuit included in the driving circuitry shown in FIG. 2.

Hence, reference is now made to FIG. 2 which illustrates a detailed circuit diagram of a driving circuit 90-1 included in the driving circuitry 90. The circuit shown in FIG. 2 is for adjusting the horizontal angle of the right side mirror 4. The driving circuit 90-1 consists of two resistors $R_1$ and $R_2$, two transistors $T_{r1}$ and $T_{r2}$, an electric motor 96, and two relays 92 and 94. A double-pole key 98 corresponds to the switch 84 shown in FIG. 1. The resistors $R_1$ and $R_2$ are interposed respectively between the outputs of the control signal generator 82 and bases of the transistors $T_{r1}$ and $T_{r2}$, for selectively supplying base bias currents to the transistors $T_{r1}$ and $T_{r2}$. The control signal generator 82 is arranged to produce control signals in accordance with the high and low levels of the input signals. As described hereinbefore, when the first and second output signals $c_1$ and $d_1$ of the first comparator 702 assume high and low levels respectively, i.e. $(c_1,d_1)=(1, 0)$, a high level signal is produced by the control signal generator 82 and is applied to a first input 95, while a low level signal is applied to a second input 97. On the other hand when the first and second output signals are expressed in terms of $(c_1,d_1)=(0, 0)$, a high level signal is applied to the second input 97, while a low level signal is applied to the first input 95. In the above, it is assumed that the output of the first OR gate $D_{1s}$ is of a low level in receipt of low level signals from the second output $D_2$ of the first comparator 702 and the OR gate E.

Figure 3:
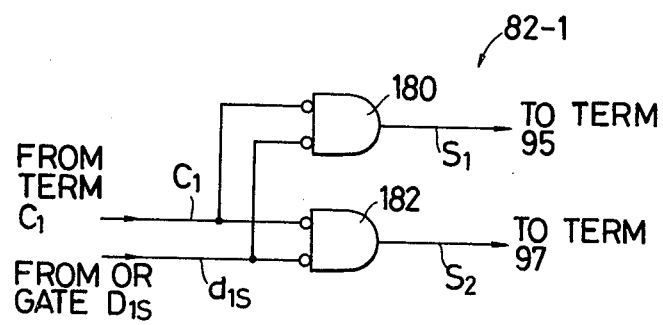
FIG. 3 shows a detailed circuit diagram of a circuit included in the control signal generator shown in FIG. 1.

The control signal generator 82 includes six independent circuits each of which is respectively responsive to the first output signal of the first to sixth comparators 702 to 712 and the output signal of the first to six OR gates $D_{1s}$ to $D_{6s}$. FIG. 3 illustrates a circuit diagram of one circuit 82-1 responsive to the signals $c_1$ and $d_{1s}$. The circuit consists of an AND gate 180 and an INVERT-AND gate 182. The first output $C_1$ of the first comparator 702 is connected to a first input of the AND gate 180 and to a first input of the INVERT-AND gate 182, while the output of the first OR gate $D_{1s}$ is connected to a second input of the AND gate 180 and to a second input of the INVERT-AND gate 182. As shown in FIG. 3, the second input of the AND gate 180 is an inverting input. The outputs of the AND gate 180 and the INVERT-AND gate 182 are respectively connected to the first and second input terminals 95 and 97 of the driving circuit 90-1 shown in FIG. 2. It will be understood that the circuit shown in FIG. 3 produces first and second output signals $S_1$ and $S_2$ in accordance with the high and low levels of the input signals $c_1$ and $d_{1s}$ as shown in the following table.

| $C_1$ | $d_{1s}$ | $S_1$ | $S_2$ |
|---|---|---|---|
| 0 | 0 | 0 | 1 |
| 0 | 1 | 0 | 0 |
| 1 | 0 | 1 | 0 |
| 1 | 1 | 0 | 0 |

Turning back to FIG. 2, the emitters of the transistors $T_{r1}$ and $T_{r2}$ are connected to ground, while the collectors of the same are respectively connected to windings 92b and 94b of the first and second relays 92 and 94. The collectors of the transistors $T_{r1}$ and $T_{r2}$ are further connected to first and second stationary contacts of the double-pole key 98 which has a movable lever or arm connected to ground. The movable lever is biased toward its neutral position and is arranged to contact with either the first or the second stationary contact $Z_1$ and $Z_2$ as long as the lever is depressed manually. The windings 92b and 94b of the first and second relays 92 and 94 are connected to a positive power supply +V at the other ends thereof. Each of the first and second relays 92 and 94 has a movable contact 92a or 94a, and two stationary contacts $X_1$ and $X_2$ or $Y_1$ and $Y_2$. The movable contacts 92a and 94a of the first and second relays are arranged to be in contact with the first stationary contacts $X_1$ and $Y_1$ respectively when the windings 92b and 94b are not energized and are arranged to contact with the second stationary contacts $X_2$ and $Y_2$ when the windings 92b and 94b are energized. The first stationary contacts $X_1$ and $Y_1$ are connected to ground, while the second stationary contacts $X_2$ and $Y_2$ are connected to the positive power supply +V. The movable contact 92a of the first relay 92 is connected to one terminal of an electric motor 96, while the movable contact 94b of the second relay 94 is connected to the other terminal of the electric motor 96. The electric motor 96 has a rotatable shaft which is operatively connected via a suitable reduction gears to the mirror 4 of the right side in a manner that the rotation of the motor shaft causes the mirror 4 to change the horizontal angle thereof.

Assuming that the first comparator 702 produces output signals $c_1$ and $d_1$ respectively assuming high and low levels, a high level signal $S_1$ is applied to the first input 95, while a low level signal $S_2$ is applied to the second input 97. Upon presence of the high and low level signals $S_1$ and $S_2$ at the inputs 95 and 97, the first transistor $T_{r1}$ becomes conductive, while the second transistor $T_{r2}$ is maintained nonconductive. At this time it is assumed that the double-pole key 98 is not operated, i.e. the movable contact thereof is in neutral. When the first transistor $T_{r1}$ becomes conductive, an electrical current flows via the winding 94b of the second relay 94 and the collector-emitter path of the first transistor $T_{r1}$ so that the second relay 94 is energized. The movable contact 94a of the second relay 94 is now in contact with the second stationary contact $Y_2$ so that an electrical current from the power supply +V flows via the second stationary contact $Y_2$, the movable contact 94a, the motor 96, the movable contact 92 of the second relay 92 and the first stationary contact $X_1$ to ground. The motor 96 is thus energized to rotate the shaft thereof in a predetermined direction, such as clockwise direction. The mirror 4 of the right side turns left, when seen from the driver, in response to the clockwise rotation of the motor 96.

On the contrary, when both of the output signals $c_1$ and $d_1$ of the first comparator 702 assume low level, a high level signal $S_2$ is applied to the second input terminal 97, while a low level signal $S_1$ is applied to the first input terminal 95. In this case the second transistor $T_{r2}$ becomes conductive, while the first transistor $T_{r1}$ is maintained nonconductive, so that only the first relay 92 is energized to supply the motor 96 with an opposite polarity electrical current. Since the motor 96 is arranged to change the direction of the rotation of the shaft thereof in accordance with the polarity of the electric current supplied thereto, the shaft of the motor 96 rotates counterclockwise. Consequently, the right side mirror 4 turns right.

The double-pole key 98 is provided to manually adjust the angle of the mirror 4. The operator may operate the key 98 to transmit a motor energizing electric current. When the movable contact of the key 98 is in contact with the first stationary contact $Z_1$, the second relay 94 is energized to turn the mirror 4 left. In the same manner, when the movable contact of the key 98 is in contact with the second stationary contact $Z_2$, the first relay 92 is energized to turn the mirror 4 right. It will be understood that the angle of the mirror 4 can be adjusted either automatically or manually.

Turning back to FIG. 1, the function of each element will be described hereinbelow in connection with the operation of the apparatus. At first, when the apparatus for adjusting the position and/or angle of each movable equipment is used, a driver sits on the driver's seat 8 to see whether the position of the seat 8 and the angle of the reclining backrest 10 is most suitable or not for him or her to operate the steering wheel, shift lever, accelerator pedal, brake pedal and/or clutch pedal. The switch circuits 84 has a key such as the double-pole key 98 shown in FIG. 2, for manually adjusting the position of the driver's seat 8. Since all of the six driving circuits are the same in construction, it is assumed that the driving circuit 90-1 shown in FIG. 2 is the driving circuit 90-5 for adjusting the position of the driver's seat 8. The driver operates the key 98 to set the position of the seat 8 by moving the seat 8 back and forth. In the same manner the angle of the backrest 10 is adjusted by operating a corresponding key. After the position of the driver's seat 8 and the angle of the reclining backrest 10 are respectively set, the horizontal and vertical angles of the mirrors 4 and 6 of the right and left sides are respectively adjusted in the same manner. When all adjustments are completed, the driver operates the channel selector 30 to designate the first channel. Then the driver operates the memory control switch 50. When the first channel is selected, a high level signal is produced only at one output of the memory 32, which is connected to the first AND gate $W_1$. Upon operation of the memory control switch 50, a high level pulse signal is applied to five AND gates $W_1$ to $W_5$. Therefore, only the output of the first AND gate $W_1$ assumes a high level for a period of time defined by the pulse width of the pulse signal from the memory control switch 50. The high level signal from the first AND gate $W_1$ is applied to the WRITE-IN control terminal W of the first memory unit 602 included in the memory circuit 60 so that information indicated by the output signals of the six sensors 12 to 24 are stored in the first memory unit 602. By the above described operation the most suitable (optimal) angles and positions of the mirrors 4 and 6, backrest 10 and the driver's seat 8 for a first driver, are stored in the first memory unit 602. In the same manner the apparatus will be operated so as to write in like information of other four drivers. When the WRITE-IN operation for all five drivers is finished, information indicative of most suitable angles and positions of the mirrors 4 and 6, backrest 10 and the driver's seat 8 for each five drivers are respectively stored in the first to fifth memory units 602 and 610.

At the end of the WRITE-IN operation of the fifth driver, the angles and position of the mirrors 4 and 6, backrest 10 and the driver's seat 8 are set at most suitable angles and position for the fifth driver and these angles and position may be different from those for other drivers. Under this condition, it is supposed that the first driver sits on the driver's seat 8. The first driver operates the channel selector 30 to designate the first channel and then he operates the drive switch 40. The memory 32 produces a high level signal at one output connected to the first AND gate $R_1$ of the another series of AND gates $R_1$ to $R_5$, while all of the AND gates $R_1$ to $R_5$ receive a high level signal at the other inputs thereof from the drive switch 40. Only the output of the first AND gate $R_1$ assumes a high level, and therefore, the high level signal is applied to the READ-OUT control terminal R of the first memory unit 602. The pieces of information stored in the first memory 602 are read out and respectively supplied to the first to sixth comparators 702 to 712 at the second inputs $B_1$ to $B_6$ thereof, while the first inputs $A_1$ to $A_6$ of the six comparators 702 to 712 are responsive to the sensed information directly fed from the six sensors 12 to 24.

Each of the six comparators 702 to 712 produces two output signals $c_1$ and $d_1$ at the first and second output terminals $C_1$ and $D_1$, ... $C_6$ and $D_6$. The high and low levels of the first and second output signals $c_1$ and $d_1$, ... $c_6$ and $d_6$ are determined in accordance with the magnitude of the input signals applied to the first inputs $A_1$ to $A_6$ with respect to the magnitude of the other input signals applied to the second inputs $B_1$ to $B_6$ as described hereinbefore. In accordance with the high and low levels of the first and second output signals $c_1$ and $d_1$ ... $c_6$ and $d_6$ of the first to sixth comparators 702 to 712, the control signal generator 82 produces various control signals, such as signals $S_1$ and $S_2$ shown in FIG. 3, with which each driving circuit such as 90-1 included in the driving circuitry 90 is energized to adjust the angles and position of the mirrors 4 and 6, reclining backrest 10 and the driver's seat 8. In the above described operation, it is assumed that the second output signals $d_1$ to $d_6$ are directly supplied to inputs of the control signal generator 82 rather than via the OR gates $D_{1s}$ to $D_{6s}$. However, as shown in FIG. 1, six OR gates $D_{1s}$ to $D_{6s}$ are actually provided for transmitting high or low level signal from the OR gate E. When the vehicle speed is over zero, i.e. when the vehicle is moving, or when the handbrake of the vehicle is not actuated, the output of the OR gate E assumes a high level so that this high level signal is transmitted to the control signal generator 82 irrespective of the state of second output signals $d_1$ to $d_6$ applied from the comparators 701 to 712 to the OR gates $D_{1s}$ to $D_{6s}$. The high level signal applied to the control signal generator 82 causes the same to produce first and second low level control signals $S_1$ and $S_2$ respectively applied to the first and second input terminals, such as terminals 95 and 97 shown in FIG. 2, of each driving circuit, such as driving circuit 90-1. Therefore, none of the electric motors, such as that 96, of all driving circuits is energized. Namely, the angles and position of the mirrors 4 and 6 backrest 10, and the driver's seat 8 are not changed under this condition. It will be understood that the above described arrangement for maintaining the deenergized condition of the motors 96 and others, is employed to secure the driver against dangerous condition, since it might be quite dangerous if the angles and position of the mirrors 4 and 6, the recling backrest 10 and the driver's seat 8 are changed without instructions of the driver, when the drive switch 40 and/or the channel selector 30 are erroneously operated. In other words, the angles and position of the mirrors 4 and 6, backrest 10 and the driver's seat 8 are changed only when the vehicle is stationary and the handbrake is actuated. Therefore, undesirable changes in angles and position of movable equipment are prevented while the vehicle is moving.

The display unit 140 is provided for indicating a selected channel by visually displaying a numeral corresponding to the channel. Hereinbelow, how the display unit 140 displays various channels is described. As described hereinbefore, the outputs of the memory 32 are connected to inputs of the encoder 120 for supplying information indicative of a selected channel. Therefore, a binary-coded signal is produced and is applied to the input of the decoder/driver 130. The decoder/driver 130 produces output signals, with which the display unit 140 is energized to indicate a specific numeral, in accordance with the binary-coded signal. The decoder/driver 130 has a blanking input BI and is arranged to produce output signals upon absence of a high level signal at the blanking input BI.

It is to be noted that the blanking input BI of the decoder/driver 130 is indirectly responsive to the output signals of the first to sixth comparators 702 to 712 via the AND gate $D_R$, the flip-flop 72, and the AND gate $D_F$. When the drive switch 40 is operated, a pulse signal is applied to the set terminal S of the flip-flop 72 so as to trigger the same. Upon presence of the pulse signal from the drive switch 40, adjustments of the angles and/or position of the vehicle equipment starts as described hereinbefore so that the AND gate $D_R$ receives low level (logic "0") signals at the input thereof from the second outputs $D_1$ to $D_6$ of the first to sixth comparators 702 to 712. Therefore, the output of the AND gate $D_R$ assumes a low level and then the low level output signal of the AND gate $D_R$ is applied to the reset terminal R of the flip-flop 72. It will be understood that the flip-flop 72 produces a high level output signal at the output Q thereof in receipt of the pulse signal from the drive switch 40. Since the AND gate $D_F$ is responsive to an oscillation signal at the other input thereof, the oscillation signal is transmitted via the AND gate $D_F$ to the blanking input BI of the decoder/drive 130. The oscillation signal applied to the blanking input BI alternatively assume high and low levels at a predetermined interval, such as one second. Upon presence of such oscillation signal at the blanking input BI, the output signals of the decoder/driver 130 are transmitted to the display unit 140 intermittently at the same frequency as the oscillation signal. Accordingly, the displayed numeral flashes at the same frequency.

When all of the adjustments are finished, the second output signals $d_1$ to $d_6$ at the second output terminals $D_1$ to $D_6$ of the first to sixth comparators 702 to 712 become high. Conseuqnetly, the AND gate $D_R$ produces a high level output signal with which the flip-flop 72 is reset. The transmission of the oscillation signal from the oscillator 110 to the blanking input BI of the decoder/driver 130 ends and therefore, the displayed numeral is continuously displayed without flashing.

It will be understood that the numeral indicating the selected channel flashes while the angles and position of the mirrors 4 and 6, backrest 10 and the driver's seat 8 are adjusted by the respective driving mechanisms. Therefore, the driver of the vehicle may easily ascertain that the angles and/or position of the vehicle equipment are under adjustment by seeing the flashing numeral on the display unit 140.

When driving circuits failure occurs, at least one of the angles and position of the mirrors 4 and 6, backrest 10 and the driver's seat 8 may not be correctly adjusted. In this case, at least one of the comparators 702 to 712 produces a low level signal at the second output $D_1$ to $D_6$ thereof to indicate that the adjustment is not finished. The low level output signal at the second output $D_1$ to $D_6$ of at least one of the comparators 702 to 712 causes the following stages to transmit the oscillation signal to the blanking input BI of the decoder/driver 130 to intermittently enable the display unit 140 in the same manner as described hereinabove. Therefore, the driver of the vehicle may ascertain that trouble has occured in the driving circuitry 90 or the driving mechanisms when he notices that the displayed numeral is flashing for over a normal period of time required for adjusting the angles and position of the mirrors 4 and 6, backrest 10 and the driver's seat 8.

In the above described preferred embodiment, the apparatus for adjusting the position and/or angle of each movable quipment consists of various discrete elements such as the memory circuit 60 and the comparator circuit 70 as shown in FIG. 1. However, if desired, the electrical circuitry enclosed by a two-dot-dash line 100 may be substituted with a microcomputer. It will be understood that application of the apparatus according to the present invention is not limited within the adjustments of the angles of rear-view mirrors and backrest and the longitudinal position of the driver's seat, and therefore, the apparatus may be used for the adjustments of other movable equipment, such as the steering wheel and the headrest. Further, it will be understood that the electrical motor 96, shown in FIG. 2, for driving each movable equipment may be substituted with a hydraulic system.

What is claimed is:

1. An apparatus for adjusting the position, including selectively the angular position, of at least one equipment movably installed in a motor vehicle such that each of said at least one equipment takes an optimal position for each of a plurality of predetermined persons expected to alternately drive the vehicle, the apparatus comprising:
    (a) first means for sensing actual position of each of said at least one equipment and providing information indicative of the sensed position;
    (b) second means having a WRITE-IN function for storing a plurality of sets of reference information each provided by said first means when each of said at least one equipment takes an optimal position for one of said persons and a READ-OUT function for selectively providing a specific set of reference information with respect to specific one of said persons;
    (c) third means responsive to said first and second means for producing at least one control signal by comparing information which is provided by said first means and is indicative of actual position of each of said at least one equipment with said specific set of reference information; and
    (d) fourth means for adjusting the position of each of said at least one equipment in accordance with said at least one control signal.

2. An apparatus as claimed in claim 1, wherein said first means comprises means for sensing the longitudinal position of the driver's seat of said motor vehicle.

3. An apparatus as claimed in claim 2, wherein said first means comprises means for sensing the rotational angle of the reclining backrest operatively connected to said driver's seat.

4. An apparatus as claimed in claim 1, wherein said first means comprises means for sensing the rotational angles in first and second directions of the rear view mirrors.

5. An apparatus as claimed in claim 1, wherein said second means comprises a plurality of memory units for storing said plurality of sets of reference information, respectively, and means for selectively enabling WRITE-IN and READ-OUT functions of each memory unit.

6. An apparatus as claimed in claim 5, further comprising display means for visually indicating which memory unit is enabled.

7. An apparatus as claimed in claim 6, further comprising means for intermittently energizing said display means until the information sensed by said first means coincides with said specific set of reference information.

8. An apparatus as claimed in claim 1, wherein said third means comprises at least one digital comparator.

9. An apparatus as claimed in claim 1, wherein said fourth means comprises at least one driving circuit including an electrical motor of a reversible type, said driving circuit producing a first signal which causes the shaft of said electrical motor to rotate in a predetermined direction, a second signal which causes said shaft of the same to rotate in an opposite direction, and a third signal which causes said electrical motor to be deenergized.

10. An apparatus as claimed in claim 1, further comprising means for disabling said further means, said disabling means including means for detecting at least one vehicle parameter indicating that the vehicle is stationary, said fourth means being disabled when said vehicle is other than stationary.

11. An apparatus as claimed in claim 10, wherein said disabling means comprises a handbrake switch for producing a signal indicating that the handbrake is not actuated, a vehicle speed sensor for producing a signal indicating that the vehicle speed is over zero, and logic gate circuits connected to said handbrake switch and to said vehicle speed sensor.

12. An apparatus as claimed in claim 1, further comprising manual switching means for manually energizing said fourth means for the adjustment irrespective of said control signal.

* * * * *